A. KISS.
DELIVERY RECEPTACLE.
APPLICATION FILED JAN. 17, 1920.
1,371,377.
Patented Mar. 15, 1921.
3 SHEETS—SHEET 1.
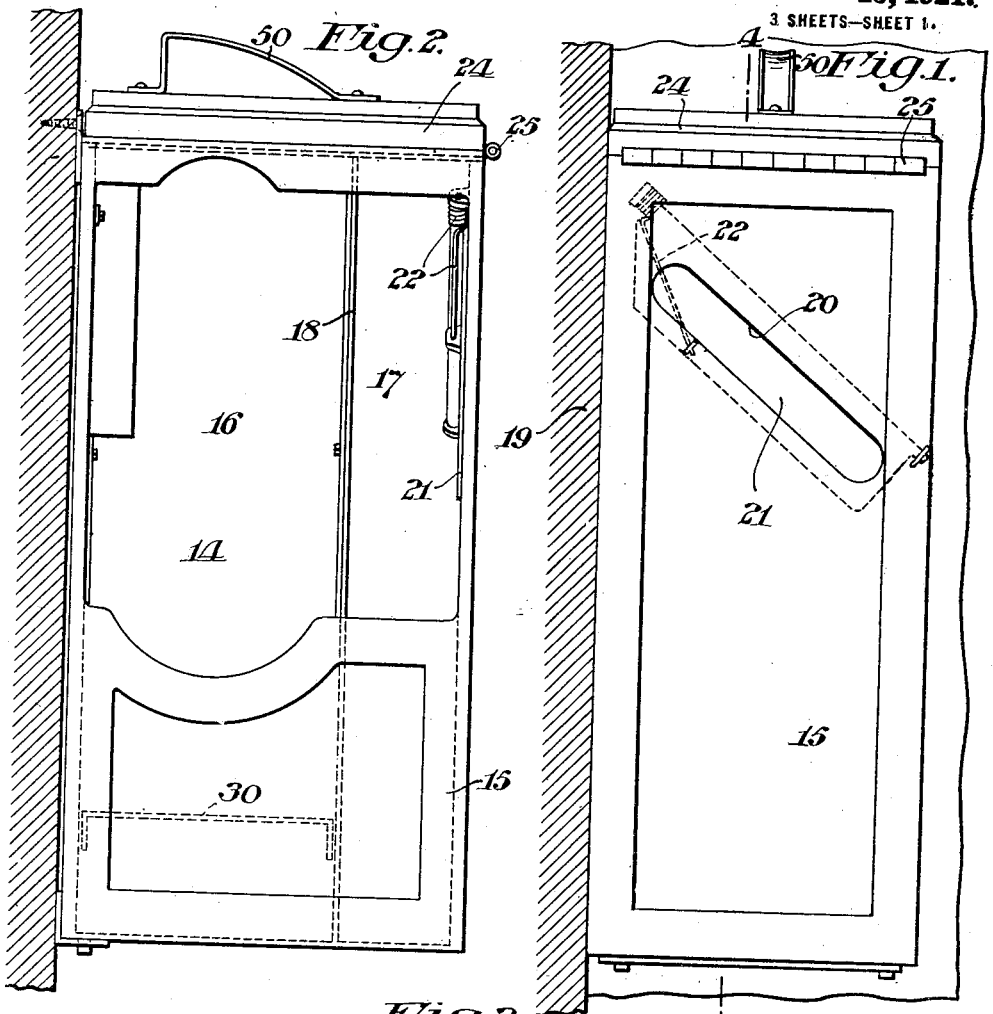
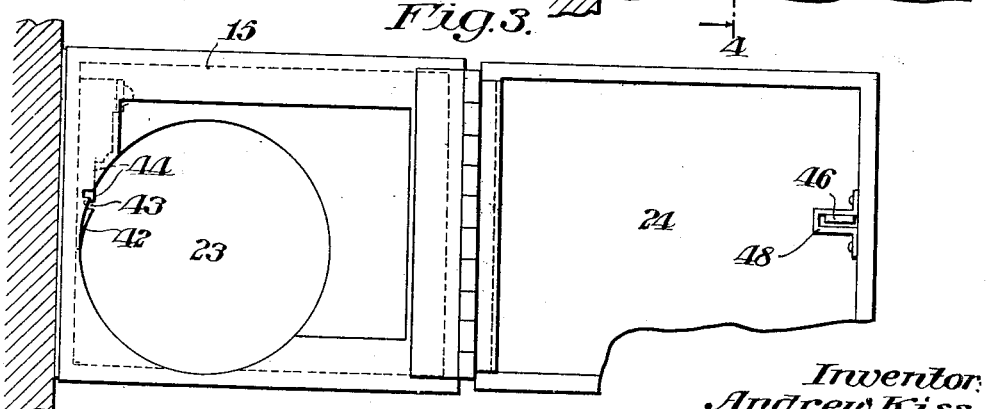
Inventor:
Andrew Kiss,
By Jas. C. Nobensmith
Attorney A. KISS.
DELIVERY RECEPTACLE.
APPLICATION FILED JAN. 17, 1920.
1,371,377.
Patented Mar. 15, 1921.
3 SHEETS—SHEET 2.
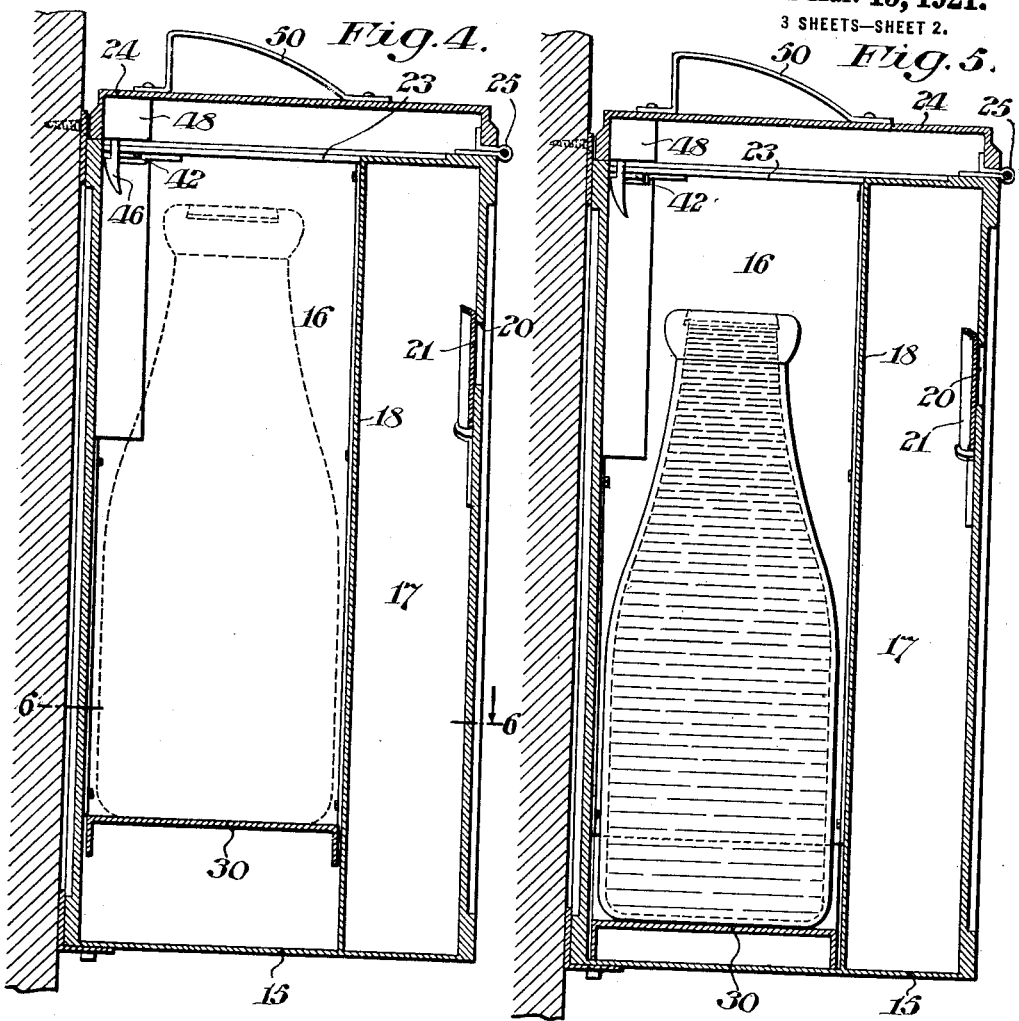
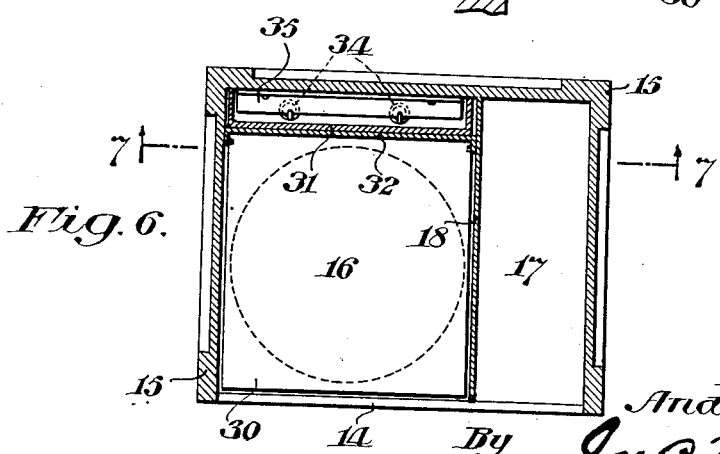
Inventor:
Andrew Kiss,
By Jas. C. Hobensmith
Attorney.

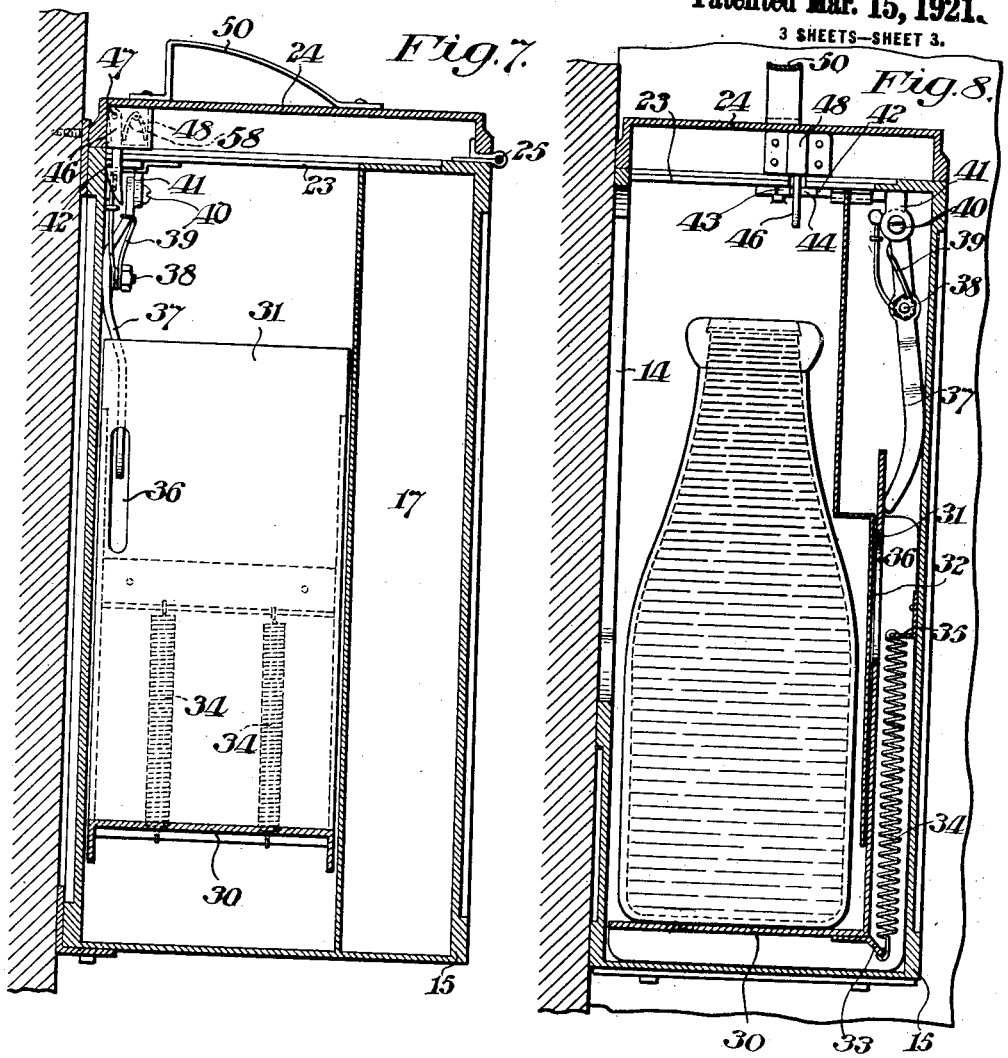

UNITED STATES PATENT OFFICE.

ANDREW KISS, OF PHILADELPHIA, PENNSYLVANIA.

DELIVERY-RECEPTACLE.

1,371,377.  Specification of Letters Patent.  Patented Mar. 15, 1921.

Application filed January 17, 1920. Serial No. 352,107.

*To all whom it may concern:*

Be it known that I, ANDREW KISS, a citizen or subject of the constituted Government of Hungary, (who has declared his intention of becoming a citizen of the United States,) residing at Philadelphia, in the county of Philadelphia and State of Pennsylvania, have invented certain new and useful Improvements in Delivery-Receptacles, of which the following is a specification.

My invention relates to delivery receptacles and it relates more particularly to an improved form of box-like device for receiving and protecting bottled milk and the like from the weather and from theft and contamination.

The object of my invention is to provide an improved form of box like device, the lid of which is adapted to be automatically locked when a full bottle of milk or similar commodity is placed therein, but which is normally maintained unlocked when the same is empty or when an empty bottle is placed therein, so that the empty bottle can be readily removed by the milk delivery man for the purpose of replacing the same with a full bottle. My invention also contemplates the provision in such a device of an auxiliary chamber for the reception of mail, which chamber is accessible for the removal of mail through the aperture through which the full bottle of milk is removed by the householder.

The nature and characteristic features of my invention will be more readily understood from the following description taken in connection with the accompanying drawings forming part herewith, in which:

Figure 1 is a front elevation of a delivery receptacle embodying the main features of my present invention, the same being shown adjacent to the door of the building to which the receptacle is attached, said door constituting a closure for the open side of the receptacle;

Fig. 2 is a side elevation thereof, showing the side which is normally closed by the door of the building to which the receptacle is attached;

Fig. 3 is a top or plan view of the receptacle, with the lid shown in the open position to permit access to the chamber which is adapted to receive the milk bottle;

Fig. 4 is a vertical transverse section of the receptacle showing the same with certain of the parts in the positions assumed when the empty bottle is in position therein, the section being taken approximately on the line 4—4 of Fig. 1;

Fig. 5 is a similar view with the parts shown in the positions assumed when a bottle filled with milk or similar commodity is placed therein;

Fig. 6 is a horizontal section taken on the line 6—6 of Fig. 4;

Fig. 7 is a vertical section taken appproximately on line 7—7 of Fig. 6, said view showing more particularly the mechanism for locking the hinged lid when the filled bottle is placed within the receptacle.

Fig. 8 is a sectional view taken transverse to Fig. 7, also illustrating the arrangement of the locking device, the parts being shown in the positions assumed when the filled bottle is placed in the chamber of the receptacle; and Figs. 9 and 10 are detached perspective views of portions of the locking mechanism detached.

Referring to the drawings, in the particular embodiment of my invention there shown, the receptacle comprises a box-like structure 15, which is attached to a building, preferably the door jamb thereof, in any suitable manner. The interior of the box-like structure 15 is sub-divided into two main chambers 16 and 17 by means of a partition 18. The chamber 16 is provided for the reception of the milk bottle, while the chamber 17 is provided for the reception of mail. The chambers 16 and 17 are accessible from the exterior through an opening 14 (see Fig. 2) which opening 14 is normally closed by the juxtaposition of the door 19 of the building, as indicated in Fig. 1 of the drawings. Of course it will be understood that where the device is to be used in a position other than adjacent the door of the building, the opening 14 may be closed by an ordinary hinged door which may be provided with a suitable lock so that access through the opening 14 may only be had by authorized persons.

The mail is adapted to be inserted into the chamber 17 through a slot 20, which is provided in one of the side walls of the structure, and which slot 20 is preferably arranged in a slanting direction, as indicated in Fig. 1 of the drawings. The slot 20 is normally closed by means of a hinged plate 21, which may be provided with a spring 22 to insure the closing of the slot 20, thus preventing the entrance of rain, snow, dust, etc.

Access to the chamber 16 is normally permitted through an opening 23 in the top of the box-like structure 15, this opening being preferably circular in shape so as to permit the removal of the empty milk bottle and the subsequent insertion of a filled one in place thereof. The opening 23 is closed by means of a lid 24, which is hinged as at 25 to one of the top edges of the structure 15. The lid 24 is adapted, when the chamber 16 is empty, or when the same contains an empty bottle merely, to be freely opened and closed about the hinge 25, but when the filled bottle of milk is placed within the chamber 16, the lid 24 will be securely locked to prevent access through the opening 23, in which case the filled bottle may be removed only through the opening 14 in the side wall of the structure 15, which opening 14 as before stated, is accessible only when the door of the building is open.

The means for automatically locking and unlocking the lid 24 may now be described. Arranged in the lower part of the chamber 16, is a platform 30 upon which the milk bottle is adapted to rest. The platform 30 is provided with an upwardly extending plate 31 (see Fig. 8) which is positioned behind a partition wall 32, which partition wall serves as a guide to permit the plate 31 to have a range of vertical movement adjacent said partition wall 32. The platform 30 also carries an extending portion 33, to which the lower ends of coil springs 34 are attached. The upper ends of the coil springs 34 are connected to an angle bracket 35 which is secured to one of the side walls of the structure 15. The coil springs 34 are of such tension as to normally maintain the platform 30 in its uppermost position when the chamber 16 is empty or when an empty bottle is in place therein, but which will permit the platform 30 to be depressed when a bottle is placed therein containing a quantity of milk.

In the upper end of the vertical extension 31 of the platform 30 there is provided a slot 36 into which the lower end of a lever 37 projects when the parts are in the raised position. The lever 37 is pivoted as at 38 and is operated by means of a spring 39 so that the lower end of the lever 37 will be caused to bear against the vertical extension 31 of platform 30. It will be seen therefore that as the member 31 is depressed, the slot 36 will pass below the end of lever 37, and on account of the contour of lever 37, the same will be actuated as said member 31 is depressed. The other end of the lever 37 is connected as at 40 to a slide member 42 which is shown in detached perspective in Fig. 10 of the drawings. The slide member 42 is provided at one place with a notch 43, adjacent which is a ledge 44 extending outward a distance beyond the base of the slot 43.

The end of the lid 24 which is most remote from the hinge 25 is provided with a latch 46 which is shown in detached perspective in Fig. 9 of the drawings. The latch 46 is pivoted as at 47 in a suitable bracket 48 which is carried by the lid 24, and said latch 46 is constrained, by means of a spring 58, to be swung forward and thus coact with the sliding member 42, as will hereinafter be more fully set forth. The lid 24 is also provided with a handle 50 to facilitate the operation thereof.

The operation of the device may now be explained. When the chamber 16 is empty, or when an empty bottle is in place therein, the springs 34 will maintain the platform 30 in its uppermost position. When the parts are in these positions, the lid 24 may be freely actuated and swung open so that access to the chamber 16 may be had through the opening 23 and the empty bottle may be placed therein irrespective of whether the door of the dwelling is open or not. Therefore, when the milkman arrives he may readily open the lid 24 and remove the empty bottle from the chamber 16.

When the milkman replaces the empty bottle with a filled one, the added weight of the contents of the bottle will cause the platform 30 to be depressed (see Figs. 5 and 8). As a result of the depression of the platform 30 the vertical extension 31 thereof will also be depressed causing the slot 36 thereof to pass below the lower end of the lever 37, consequently the lever 37 will be actuated against the tension of the spring 39, and the upper end of the said lever will be moved forward, causing the slide member 42 to be also moved forward and bringing the ledge 44 thereof beneath the lip 49 of the latch member 46 which is carried by lid 24. As long as the slide member 42 is maintained in the forward position by means of the weight of the contents of the bottle, the lip 49 of the latch 46 will continue to engage the ledge 44 of the slide 42, consequently the lid 24 will be securely locked in the closed position.

When, however, the filled bottle is removed by the householder through side opening 14, which is permitted when the dwelling door is open, the platform 30 will be permitted to rise under the tension of the springs 34, thus causing the slide member 42, through the intermediary of the intervening mechanism hereinbefore described to be retracted, whereupon the notch 43 of the slide 42 will be brought opposite the lip 49 of the latch 46, and thereby the latch will be free of engagement with the slide member 42, and the lid 24 may then be swung about its hinge 25 to permit access through the opening 23 as desired.

It will be seen that there is thus provided a simple and efficient receptacle for the delivery of milk and the like which is so arranged as to effectually protect the bottled milk from the weather and from theft and contamination, and in which the empty bottle is freely accessible to the milkman while the filled bottle which may be substituted in place therefor by the milkman will automatically be locked in the chamber which is adapted to receive the same.

Having thus described the nature and characteristic features of my invention, what I claim as new and desire to secure by Letters Patent is

1. A device of the character described comprising a box-like structure having an interior chamber adapted to receive a milk bottle or the like, an opening permitting access to said chamber, a lid adapted to close said opening, a depressible platform within said chamber upon which the milk bottle is adapted to rest, springs supporting said platform against the weight of an empty bottle of such strength as to permit the same to be depressed when a filled bottle is placed on said platform, a lever operatively controlled by an extension of said platform, a slide member actuated by said lever, and a spring latch carried by the lid coacting with said slide member, said slide member being so shaped and actuated as to permit the spring latch carried by the lid to freely pass when the platform is in its upper position, and to be retained when said platform is in its lower position.

2. A device of the character described comprising a box-like structure having an interior chamber adapted to receive a milk bottle or the like, an opening permitting access to said chamber, a lid adapted to close said opening, a depressible platform within said chamber upon which the milk bottle is adapted to rest, springs supporting said platform against the weight of an empty bottle but permitting the same to be depressed when a filled bottle is placed on said platform, a member extending from said platform having a slot in a portion thereof, a lever having its lower end engaging said slot when the platform is in the raised position but adapted to engage and be actuated by said extending member when the platform is in its lower position, a slide member actuated by said lever, and a spring latch carried by the lid coacting with said slide member, said slide member being so shaped as to permit the spring latch carried by the lid to freely pass when the platform is in its upper position, and to be retained when said platform is in its lower position.

In testimony whereof I have hereunto signed my name.

ANDREW KISS.